United States Patent
Yasuda et al.

(10) Patent No.: US 9,509,493 B2
(45) Date of Patent: Nov. 29, 2016

(54) INFORMATION PROCESSING TECHNIQUE FOR SECURE PATTERN MATCHING

(71) Applicant: FUJITSU LIMITED, Kawasaki-shi, Kanagawa (JP)

(72) Inventors: Masaya Yasuda, Kawasaki (JP); Takeshi Shimoyama, Shinagawa (JP); Jun Kogure, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 14/446,772

(22) Filed: Jul. 30, 2014

(65) Prior Publication Data

US 2015/0046708 A1    Feb. 12, 2015

(30) Foreign Application Priority Data

Aug. 7, 2013  (JP) ................................. 2013-163793

(51) Int. Cl.
  *G06F 21/00*   (2013.01)
  *H04L 9/00*    (2006.01)
  *H04L 9/14*    (2006.01)

(52) U.S. Cl.
  CPC ................ *H04L 9/008* (2013.01); *H04L 9/14* (2013.01); *H04L 2209/24* (2013.01)

(58) Field of Classification Search
  CPC ...... H04L 9/008; H04L 9/14; H04L 2209/24
  See application file for complete search history.

(56) References Cited

U.S. PATENT DOCUMENTS

| 7,437,398 B2 | 10/2008 | Ramkumar |
| 8,271,403 B2 | 9/2012 | Rieck et al. |
| 2010/0246812 A1 | 9/2010 | Rane et al. |
| 2010/0329448 A1 | 12/2010 | Rane et al. |

(Continued)

FOREIGN PATENT DOCUMENTS

| JP | 2006-59339 | 3/2006 |
| JP | 2008-521025 A | 6/2008 |

(Continued)

OTHER PUBLICATIONS

Extended European Search Report issued Aug. 3, 2015 in Patent Application No. 14179107.9.

(Continued)

*Primary Examiner* — Chau Le
*Assistant Examiner* — Ghodrat Jamshidi
(74) *Attorney, Agent, or Firm* — Oblon, McClelland, Maier & Neustadt, L.L.P.

(57) ABSTRACT

An encrypted first polynomial that is obtained by encrypting, in a homomorphic encryption method that handles a polynomial processing, a first polynomial, is received from another computer. The first polynomial is represented by using, as coefficients, components of a first binary vector generated from first data in first order that is either ascending order or descending order with respect to degree of the first polynomial. Then, a predetermined processing in an encrypted text space is performed by using the encrypted first polynomial and an encrypted second polynomial that is obtained by encrypting a second polynomial in the homomorphic encryption method. The second polynomial is represented by using, as coefficients, components of a second binary vector generated from second data in second order that is different from the first order with respect to degree of the second polynomial. Then, a result of the predetermined processing is sent back.

8 Claims, 9 Drawing Sheets

(56) References Cited

U.S. PATENT DOCUMENTS

| | | |
|---|---|---|
| 2011/0026781 A1 | 2/2011 | Osadchy et al. |
| 2011/0099385 A1 | 4/2011 | Takahashi |
| 2011/0135096 A1 | 6/2011 | Rane et al. |
| 2011/0176672 A1 | 7/2011 | Rane et al. |
| 2012/0163588 A1* | 6/2012 | Kobayashi ............ H04L 9/3073 380/28 |
| 2012/0201378 A1* | 8/2012 | Nabeel .................... H04L 9/008 380/255 |
| 2012/0207299 A1 | 8/2012 | Hattori et al. |
| 2013/0114811 A1 | 5/2013 | Boufounos et al. |
| 2014/0105385 A1 | 4/2014 | Rane et al. |
| 2014/0281567 A1* | 9/2014 | Rane ....................... G06F 21/32 713/186 |

FOREIGN PATENT DOCUMENTS

| | | |
|---|---|---|
| JP | 2009-523270 | 6/2009 |
| JP | 2010-237653 A | 10/2010 |
| JP | 2011-013672 A | 1/2011 |
| JP | 2011-090539 A | 5/2011 |
| JP | 2011-118387 A | 6/2011 |
| JP | 2011-145512 A | 7/2011 |
| JP | 2012-150379 | 8/2012 |
| WO | WO 2006/054208 | 5/2006 |

OTHER PUBLICATIONS

Masaya Yasuda, et al., "Secure Pattern Matching using Somewhat Homomorphic Encryption" Cloud Computing Security Workshop, ACM, 2 Penn Plaza , Suite 701, New York, NY 10121-0701 USA, XP058034246, Nov. 8, 2013, pp. 65-76.

Masaya Yasuda, et al., "Analysis of Lattice Reduction Attack against the Somewhat Homomorphic Encryption Based on Ideal Lattices" Advances in Communication Networking: 20$^{th}$ Eunice/IFIP EG 6.2, 6.6 International Workshop, Rennes, France, Revised Selected Papers (Lecture Notes in Computer Science ), XP047037754, Sep. 13, 2012, pp. 1-16.

R. (Inald) L. Lagendijk, et al., "Encrypted Signal Processing for Privacy Protection: Conveying the utility of homomorphic encryption and multiparty computation", IEEE Signal Processing Magazine, vol. 30, No. 1, XP011505535, Jan. 2013, pp. 82-105.

Joshua Baron, et al., "5PM: Secure Pattern Matching" International Association for Cryptologic Research, vol. 20121219:161334, XP061007031, Dec. 12, 2012, pp. 1-77.

Craig Gentry, "Fully Homomorphic Encryption Using Ideal Lattices", STOC, 2009, ACM, 10 pages.

Kristin Lauter, et al., "Can Homomorphic Encryption be Practical?", ACM Workshop on Cloud Computing Security Workshop-CCSW 2011, ACM, 11 pages.

U.S. Office Action dated Feb. 27, 2015, issued in U.S. Appl. No. 14/104,758 (now U.S. Pat. No. 9,100,185).

U.S. Notice of Allowance dated Jun. 2, 2015, issued in U.S. Appl. No. 14/104,758.

Extended European Search Report dated Apr. 7, 2014, issued in European Patent Application No. 13197688.8.

Gentry, Craig et al., "Implementing Gentry's Fully-Homomorphic Encryption Scheme", Feb. 4, 2011, pp. 1-29. Retrieved from the internet: URL: http://researcher.watson.ibm.com/researcher/files/us-shaih/fhe-implementation.pdf, [retrieved on Jun. 18, 2012].

Yasuda, Masaya et al., Guo Chengan Cguodel Talut Edu CN Dalian University of Technology School of Information and Communication Engine: "Packed Homomorphic Encryption Based on Ideal Lattices and Its Application to Biometrics", Sep. 2, 2013, The Semantic Web—ISWC 2004; [Lecture Notes in Computer Science], Springer Berlin Heidelberg, pp. 55-74.

Craig Gentry, "Fully Homomorphic Encryption Using Ideal Lattices", STOC 2009, ACM Press, pp. 169-178, May 31-Jun. 2, 2009.

Craig Gentry et al., "Implementing Gentry's Fully-Homomorphic Encryption Scheme", Lecture Notes in Computer Science, vol. 6632, pp. 129-148 (pp. 1-30), Aug. 5, 2010.

Masaya Yasuda et al., "Secret Totalization of Purchase Histories of Companies in Cloud", The 29$^{th}$ Symposium on Cryptography and Information Security, Jan. 30-Feb. 2, 2012. Partial translation of Outline at p. 1 and Table 4 at p. 4.

\* cited by examiner

| POSITION | 1 | 2 | 3 | 4 | 5 | 6 | 7 | 8 | 9 | 10 |
|---|---|---|---|---|---|---|---|---|---|---|
| TEXT | a | c | b | a | b | b | a | c | c | b |
| PATTERN | <u>a</u> | b | <u>b</u> | <u>a</u> | c | | | | | |
| | | a | <u>b</u> | b | a | c | | | | |
| | | | a | b | <u>b</u> | a | c | | | |
| | | | | <u>a</u> | <u>b</u> | <u>b</u> | <u>a</u> | <u>c</u> | | |
| | | | | | a | <u>b</u> | b | a | <u>c</u> | |
| | | | | | | a | b | b | a | c |
| SCORE VECTOR | 3 | 1 | 1 | 5 | 2 | 0 | | | | |

| (1) TEXT POLYNOMIAL $m_t(T)$ | (2) PATTERN POLYNOMIAL $m_p(P)$ | (a) AUXILIARY DATA $C_l$ | (b) AUXILIARY DATA $C_k$ | DISTANCE CALCULATION EXPRESSION |
|---|---|---|---|---|
| $\sum t_i x^i$ | $-\sum p_j x^{n-j}$ | $(-\sum x^{n-j}, 0)$ | $(\sum x^i, 0)$ | $(1)*(a) + (2)*(b) - 2(1)*(2)$ |
| $\sum t_i x^i$ | $-\sum p_j x^{n-j}$ | $(-\sum x^{n-j}, 0)$ | $(-\sum x^i, 0)$ | $(1)*(a) - (2)*(b) - 2(1)*(2)$ |
| $\sum t_i x^i$ | $-\sum p_j x^{n-j}$ | $(\sum x^{n-j}, 0)$ | $(\sum x^i, 0)$ | $-(1)*(a) + (2)*(b) - 2(1)*(2)$ |
| $\sum t_i x^i$ | $-\sum p_j x^{n-j}$ | $(\sum x^{n-j}, 0)$ | $(-\sum x^i, 0)$ | $-(1)*(a) - (2)*(b) - 2(1)*(2)$ |
| $\sum t_i x^i$ | $\sum p_j x^{n-j}$ | $(-\sum x^{n-j}, 0)$ | $(\sum x^i, 0)$ | $(1)*(a) - (2)*(b) + 2(1)*(2)$ |
| $\sum t_i x^i$ | $\sum p_j x^{n-j}$ | $(-\sum x^{n-j}, 0)$ | $(-\sum x^i, 0)$ | $(1)*(a) + (2)*(b) + 2(1)*(2)$ |
| $\sum t_i x^i$ | $\sum p_j x^{n-j}$ | $(\sum x^{n-j}, 0)$ | $(\sum x^i, 0)$ | $-(1)*(a) - (2)*(b) + 2(1)*(2)$ |
| $\sum t_i x^i$ | $\sum p_j x^{n-j}$ | $(\sum x^{n-j}, 0)$ | $(-\sum x^i, 0)$ | $-(1)*(a) + (2)*(b) + 2(1)*(2)$ |
| $-\sum t_i x^i$ | $-\sum p_j x^{n-j}$ | $(-\sum x^{n-j}, 0)$ | $(\sum x^i, 0)$ | $-(1)*(a) + (2)*(b) + 2(1)*(2)$ |
| $-\sum t_i x^i$ | $-\sum p_j x^{n-j}$ | $(-\sum x^{n-j}, 0)$ | $(-\sum x^i, 0)$ | $-(1)*(a) - (2)*(b) + 2(1)*(2)$ |
| $-\sum t_i x^i$ | $-\sum p_j x^{n-j}$ | $(\sum x^{n-j}, 0)$ | $(\sum x^i, 0)$ | $(1)*(a) + (2)*(b) + 2(1)*(2)$ |
| $-\sum t_i x^i$ | $-\sum p_j x^{n-j}$ | $(\sum x^{n-j}, 0)$ | $(-\sum x^i, 0)$ | $(1)*(a) - (2)*(b) + 2(1)*(2)$ |
| $-\sum t_i x^i$ | $\sum p_j x^{n-j}$ | $(-\sum x^{n-j}, 0)$ | $(\sum x^i, 0)$ | $-(1)*(a) - (2)*(b) - 2(1)*(2)$ |
| $-\sum t_i x^i$ | $\sum p_j x^{n-j}$ | $(-\sum x^{n-j}, 0)$ | $(-\sum x^i, 0)$ | $-(1)*(a) + (2)*(b) - 2(1)*(2)$ |
| $-\sum t_i x^i$ | $\sum p_j x^{n-j}$ | $(\sum x^{n-j}, 0)$ | $(\sum x^i, 0)$ | $(1)*(a) - (2)*(b) - 2(1)*(2)$ |
| $-\sum t_i x^i$ | $\sum p_j x^{n-j}$ | $(\sum x^{n-j}, 0)$ | $(-\sum x^i, 0)$ | $(1)*(a) + (2)*(b) - 2(1)*(2)$ |

FIG.9

| (1) TEXT POLYNOMIAL $m_t(T)$ | (2) PATTERN POLYNOMIAL $m_p(P)$ | (a) AUXILIARY DATA $C_l$ | (b) AUXILIARY DATA $C_k$ | DISTANCE CALCULATION EXPRESSION |
|---|---|---|---|---|
| $-\Sigma t_j x^{n-j}$ | $\Sigma p_i x^i$ | $(\Sigma x^i, 0)$ | $(-\Sigma x^{n-j}, 0)$ | $(1)*(a) + (2)*(b) - 2(1)*(2)$ |
| $-\Sigma t_j x^{n-j}$ | $\Sigma p_i x^i$ | $(\Sigma x^i, 0)$ | $(\Sigma x^{n-j}, 0)$ | $(1)*(a) - (2)*(b) - 2(1)*(2)$ |
| $-\Sigma t_j x^{n-j}$ | $\Sigma p_i x^i$ | $(-\Sigma x^i, 0)$ | $(-\Sigma x^{n-j}, 0)$ | $-(1)*(a) + (2)*(b) - 2(1)*(2)$ |
| $-\Sigma t_j x^{n-j}$ | $\Sigma p_i x^i$ | $(-\Sigma x^i, 0)$ | $(\Sigma x^{n-j}, 0)$ | $-(1)*(a) - (2)*(b) - 2(1)*(2)$ |
| $-\Sigma t_j x^{n-j}$ | $-\Sigma p_i x^i$ | $(\Sigma x^i, 0)$ | $(-\Sigma x^{n-j}, 0)$ | $(1)*(a) - (2)*(b) + 2(1)*(2)$ |
| $-\Sigma t_j x^{n-j}$ | $-\Sigma p_i x^i$ | $(\Sigma x^i, 0)$ | $(\Sigma x^{n-j}, 0)$ | $(1)*(a) + (2)*(b) + 2(1)*(2)$ |
| $-\Sigma t_j x^{n-j}$ | $-\Sigma p_i x^i$ | $(-\Sigma x^i, 0)$ | $(-\Sigma x^{n-j}, 0)$ | $-(1)*(a) - (2)*(b) + 2(1)*(2)$ |
| $-\Sigma t_j x^{n-j}$ | $-\Sigma p_i x^i$ | $(-\Sigma x^i, 0)$ | $(\Sigma x^{n-j}, 0)$ | $-(1)*(a) + (2)*(b) + 2(1)*(2)$ |
| $\Sigma t_j x^{n-j}$ | $\Sigma p_i x^i$ | $(\Sigma x^i, 0)$ | $(-\Sigma x^{n-j}, 0)$ | $-(1)*(a) + (2)*(b) + 2(1)*(2)$ |
| $\Sigma t_j x^{n-j}$ | $\Sigma p_i x^i$ | $(\Sigma x^i, 0)$ | $(\Sigma x^{n-j}, 0)$ | $-(1)*(a) - (2)*(b) + 2(1)*(2)$ |
| $\Sigma t_j x^{n-j}$ | $\Sigma p_i x^i$ | $(-\Sigma x^i, 0)$ | $(-\Sigma x^{n-j}, 0)$ | $(1)*(a) + (2)*(b) + 2(1)*(2)$ |
| $\Sigma t_j x^{n-j}$ | $\Sigma p_i x^i$ | $(-\Sigma x^i, 0)$ | $(\Sigma x^{n-j}, 0)$ | $(1)*(a) - (2)*(b) + 2(1)*(2)$ |
| $\Sigma t_j x^{n-j}$ | $-\Sigma p_i x^i$ | $(\Sigma x^i, 0)$ | $(-\Sigma x^{n-j}, 0)$ | $-(1)*(a) - (2)*(b) - 2(1)*(2)$ |
| $\Sigma t_j x^{n-j}$ | $-\Sigma p_i x^i$ | $(\Sigma x^i, 0)$ | $(\Sigma x^{n-j}, 0)$ | $-(1)*(a) + (2)*(b) - 2(1)*(2)$ |
| $\Sigma t_j x^{n-j}$ | $-\Sigma p_i x^i$ | $(-\Sigma x^i, 0)$ | $(-\Sigma x^{n-j}, 0)$ | $(1)*(a) - (2)*(b) - 2(1)*(2)$ |
| $\Sigma t_j x^{n-j}$ | $-\Sigma p_i x^i$ | $(-\Sigma x^i, 0)$ | $(\Sigma x^{n-j}, 0)$ | $(1)*(a) + (2)*(b) - 2(1)*(2)$ |

FIG.10

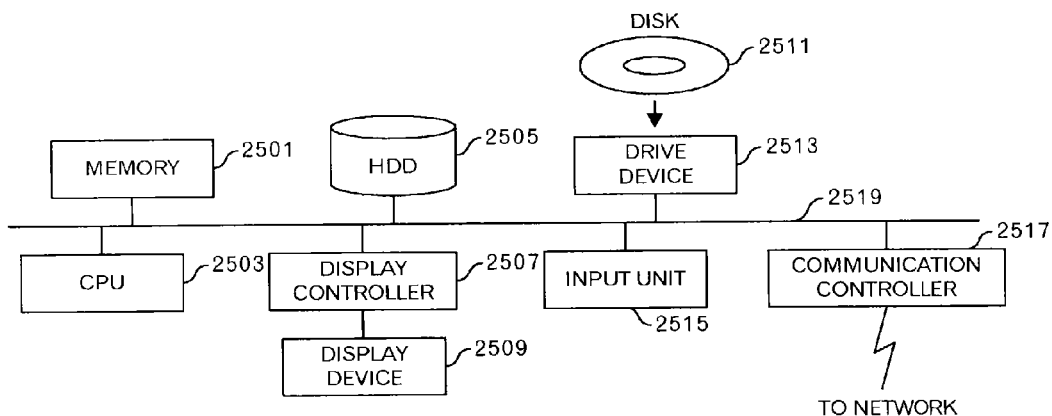

FIG.11

INFORMATION PROCESSING TECHNIQUE FOR SECURE PATTERN MATCHING

CROSS-REFERENCE TO RELATED APPLICATIONS

This application is based upon and claims the benefit of priority of the prior Japanese Patent Application No. 2013-163793, filed on Aug. 7, 2013, the entire contents of which are incorporated herein by reference.

FIELD

This invention relates to a technique for performing pattern matching with data masked.

BACKGROUND

Recently, regulations to protect personal information and secret information are tightened, on the other hand, markets of services that utilizes such information are expanding. Then, attention is paid to masking (or hiding) techniques that are capable of utilizing data with the personal information and secret information protected. There is a technique that uses a cryptographic technique or statistical technique, depending on data types and/or service requirement, among the masking techniques.

As a masking technique that uses the cryptographic technique, a homomorphic encryption technique is known. The homomorphic encryption technique is a public-key cryptographic method in which a key for encryption and a key for decryption are different, and has a function for enabling data operation with data encrypted. For example, as for texts m1 and m2, E represents an encryption function in the homomorphic encryption method for addition or multiplication. Then, there is a property represented by a following expression (1) or (2).

$$E(m1)+E(m2)=E(m1+m2) \quad (1)$$

$$E(m1)*E(m2)=E(m1*m2) \quad (2)$$

The encryption method that has the property of the expression (1) is called "homomorphic with respect to addition", and the encryption method that has the property of the expression (2) is called "homomorphic with respect to multiplication".

When the homomorphic encryption method is used, it is possible to obtain an encrypted text that is a calculation result of the addition or multiplication by adding or multiplying encrypted texts without decrypting the encrypted texts. This property of the homomorphic encryption method is expected to be used in a field such as an electronic voting system and electronic money, furthermore recently in a cloud-computing field.

As the homomorphic encryption method, Rivest Shamir Adleman (RSA) encryption method (which is homomorphic only with respect to the multiplication) and Additive ElGamal encryption method (which is homomorphic only with respect to the addition) are typical. Moreover, a homomorphic encryption method (i.e. the expressions (1) and (2) are established.) that is capable of adding and multiplying was proposed in 2009 (See C. Gentry, "Fully Homomorphic encryption using ideal lattices", STOC 2009, ACM, pp. 169-178, 2009.). However, this homomorphic encryption method is known to be impractical in view of the processing capability and size of encrypted data. Then, in 2011, a homomorphic encryption method, which is capable of adding and multiplying and practical in view of both of the processing capability and size of the encrypted data, was proposed, and its application example is presented (See K. Lauter, M. Naehrig and V. Vaikuntanathan, "Can Homomorphic Encryption be Practical?", In ACM workshop on Cloud Computing Security Workshop-CCSW 2011, ACM, pp. 113-124, 2011.).

Here, the homomorphic encryption method proposed in 2011 will be explained (See Section 3.2 of the aforementioned paper). Firstly, in order to generate cryptographic keys, three key generation parameters (n, q, t) are prepared, mainly. "n" is an integer that is a power of "2" and called "a lattice degree", q is a prime number, and t is an integer that is less than the prime number q. As for the procedure of the cryptographic key generation, a polynomial sk whose coefficient is respectively very little and that has degree n is randomly generated as a secret key, firstly. The value of each coefficient is limited by a certain parameter σ. Next, a polynomial a1 that has degree n and whose coefficient is respectively less than q and a polynomial e that has degree n and whose coefficient is respectively very little, are randomly generated.

Then, a0=−(a1*sk+t*e) is calculated, and a pair (a0, a1) is defined as a public key pk. However, a polynomial whose degree is less than the degree n is always calculated by using $x^n=-1$, $x^{n+1}=-x$, . . . with respect to polynomials whose degree is greater than the degree n when the polynomial calculation is performed for "a0". Furthermore, as for coefficients of the polynomial, a remainder obtained by dividing by the prime number q is outputted. The space in which such operations are performed is often represented as $Rq=Fq[x]/(x^n+1)$ scholarly.

Next, 3 polynomials u, f and g that have the degree n and whose coefficient is respectively very little are randomly generated for the public key pk=(a0, a1) and text data m that is represented by a polynomial of degree n and whose coefficient is respectively less than t, and encrypted data E(m, pk)=(c0, c1) of the text data m is defined as follows:

$$c0=a0*u+t*g+m, c1=a1*u+t*f$$

This calculation is also performed on the space Rq.

Then, as for two encrypted texts E (m1, pk)=(c0, c1) and E (m2, pk)=(d0, d1), the cryptographic addition E (m1, pk)+E(m2, pk) is calculated as (c0+d0, c1+d1), and the cryptographic multiplication E (m1, pk)*E(m2, pk) is calculated as (c0+d0, c0*d1+c1*d0, c1*d1). Note that the number of components in the vector of the encrypted text is changed from "2" to "3" when performing the cryptographic multiplication.

Finally, in the decryption processing, an encrypted text c=(c0, c1, c2, . . . ) is decrypted by using the secret key sk by calculating D (c, sk)=[c0+c1*sk+c2*$sk^2$+ . . . ] q mod t. Here, it is assumed that the number of components of the encrypted text data has been increased by cryptographic operations such as cryptographic multiplication for plural times. Here, as a value [z] q, a remainder w is calculated by dividing the integer z by q, and in case of w<q, [z]q=w is outputted, and in case of w≥q, [z]q=w−q is outputted. Furthermore, a mod t means a remainder obtained by dividing the integer a by t.

In order to make it easy to understand the aforementioned calculations, numerical examples will be exhibited.
Secret key sk=Mod(Mod(4, 1033)*$x^3$+Mod(4, 1033)*$x^2$+ Mod(1, 1033)*x, $x^4$+1)
Public key pk=(a0, a1)
a0=Mod(Mod(885, 1033)*$x^3$+Mod(519, 1033)*$x^2$+Mod (621, 1033)*x+Mod(327, 1033), $x^4$, $x^4$+1)

a1=Mod(Mod(661, 1033)*$x^3$+Mod(625, 1033)*$x^2$+Mod(861, 1033)*x+Mod(311, 1033), $x^4$+1)

E(m, pk)=(c0, c1)

Text data m=3+2x+2$x^2$+2$x^3$ c0=Mod(Mod(822, 1033)*$x^3$+Mod(1016, 1033)*$x^2$+Mod(292, 1033)*x+Mod(243, 1033), $x^4$+1)

c1=Mod(Mod(840, 1033)*$x^3$+Mod(275, 1033)*+Mod(628, 1033)*x+Mod(911, 1033), $x^4$+1)

As for the aforementioned values, (4, 1033, 20) is used as the key generation parameters (n, q, t). Furthermore, Mod (a, q) means a remainder obtained by dividing the integer a by the prime number q, and Mod (f (x), $x^4$+1) means a remainder polynomial obtained by dividing the polynomial f (x) by the polynomial $x^4$+1. However, note $x^4$=−1, $x^5$=x, . . . .

Next, the pattern matching will be explained, simply. The pattern matching is a processing to determine whether or not a pattern character string exists in a text character string, for example, and specifically, a processing to determine whether or not a pattern character string P="abbac" exists in a text character string T="acbabbaccb" is considered. In such a case, as illustrated in FIG. 1, while the pattern character string P is shifted character-by-character against the text character string T, the number of characters at which the text and the pattern coincide (also called distance) is calculated. In FIG. 1, an arrangement of values that represent the aforementioned number of characters is called "a score vector". In this example, because the length of the pattern character string P is "5", it is understood that the pattern character string P and the text character string T coincide at a component position whose value is "5" in the score vector.

Thus, in the pattern matching without the encryption, the distance with the text character string is calculated while shifting the pattern character string P character-by-character against the text character string T.

On the other hand, in the secure pattern matching that utilizes the homomorphic encryption method, plural distances are calculated in a state where the text character string T and pattern character string P are encrypted in the homomorphic encryption method. Here, a secure pattern matching calculation model is considered in which there are an information registrant who has a text character string T, a collator who has a pattern character string P and a cloud provider who performs a cryptographic distance calculation in the secure pattern matching. Firstly, the collator generates a public key and secret key by generating keys in the homomorphic encryption method, and opens only the public key in public for the information registrant and the cloud provider. After that, the information registrant uses the public key transmitted from the collator to encrypt the text character string T, which is owned by itself, in the homomorphic encryption method, and saves the encrypted text E (T) in a database in the cloud. In order to determine whether the pattern character string P exists, the collator encrypts the pattern character string P in the homomorphic encryption method, and sends the encrypted pattern E (P) to the cloud. The cloud calculates plural distances for T and P with respect to the encrypted text E (T) and encrypted pattern E (P) while the encrypted state is kept, and transmits the calculation results to the collator. The collator decrypts encrypted calculation results transmitted from the cloud by using the secret key which is owned by itself, and determines whether or not the pattern character string P is included in the text character string T from the decryption results.

In case of such secure pattern matching in the cloud, because a processing is performed in a state where data is encrypted on the cloud, data of the information registrant and the collator is not opened in public. Accordingly, in an environment such as cloud whose security is not so strong, it is possible to outsource the pattern matching processing.

However, only application of the homomorphic encryption method simply to the pattern matching is impractical in view of data amounts and/or calculation loads.

Non-Patent Document 1: C. Gentry, "Fully Homomorphic encryption using ideal lattices", STOC 2009, ACM, pp. 169-178, 2009.

Non-Patent Document 2: K. Lauter, M. Naehrig and V. Vaikuntanathan, "Can Homomorphic Encryption be Practical?", In ACM workshop on Cloud Computing Security Workshop-CCSW 2011, ACM, pp. 113-124, 2011.

SUMMARY

An information processing method relating to a first aspect of this invention includes: (A) generating a first binary vector from first data; (B) generating a first polynomial that is represented by using, as coefficients, components of the first binary vector in first order that is either ascending order or descending order with respect to degree of the first polynomial; and (C) encrypting the first polynomial in a homomorphic encryption method that handles a polynomial processing.

An information processing method relating to a second aspect of this invention includes: (A) receiving an encrypted first polynomial that is obtained by encrypting, in a homomorphic encryption method that handles a polynomial processing, a first polynomial, from another computer, wherein the first polynomial is represented by using, as coefficients, components of a first binary vector generated from first data in first order that is either ascending order or descending order with respect to degree of the first polynomial; (B) performing, a predetermined processing in an encrypted text space by using the encrypted first polynomial and an encrypted second polynomial that is obtained by encrypting a second polynomial in the homomorphic encryption method, wherein the second polynomial is represented by using, as coefficients, components of a second binary vector generated from second data in second order that is different from the first order with respect to degree of the second polynomial; and (C) transmitting a result of the predetermined processing to the another computer. The predetermined processing is defined so that a coefficient of each term in a third polynomial that is obtained by decrypting the result of the predetermined processing represents a distance at each component position of the second binary vector, from which the first binary vector is compared.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is a diagram depicting variations of calculation in secure pattern matching;

FIG. 10 is a diagram depicting variations of calculation in the secure pattern matching; and FIG. 11 is a functional block diagram of a computer.

DESCRIPTION OF EMBODIMENTS

Figures 1, 3:
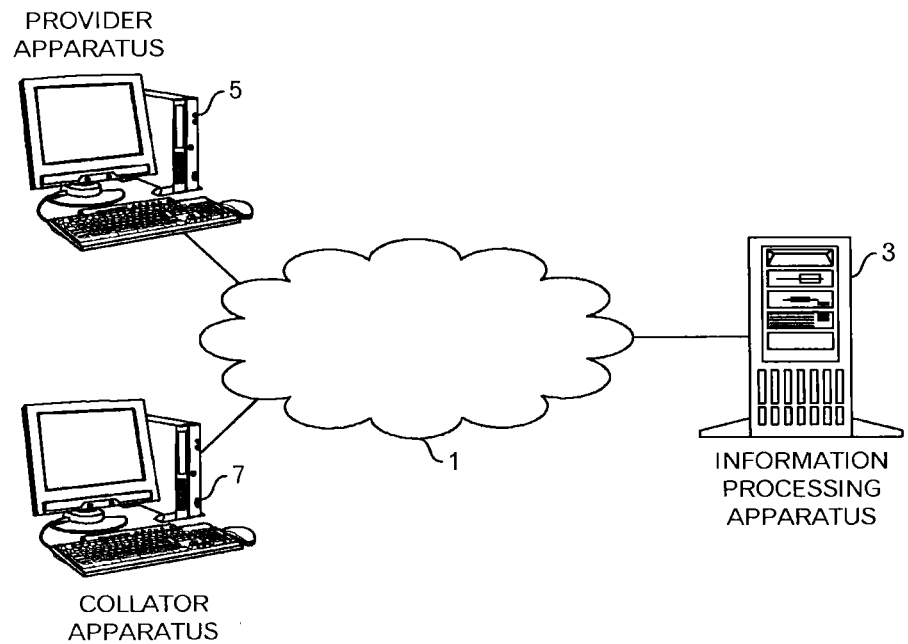
FIG. 1 is a diagram to explain pattern matching.
FIG. 3 is a diagram depicting an outline of a system relating to an embodiment of this invention.

Firstly, an outline of a processing relating to an embodiment of this invention will be explained.

In the secure pattern matching calculation that utilizes the homomorphic encryption method, in order to reduce the data size and distance calculation cost, a polynomial that is represented by using, as a coefficient, each bit of a binarized text in ascending order with respect to the degree is calculated and encrypted in the homomorphic encryption method that is capable of performing a polynomial processing (e.g. Ring-LWE based homomorphic encryption method, specifically see K. Lauter, M. Naehrig and V. Vaikuntanathan, "Can Homomorphic Encryption be Practical?"). On the other hand, a polynomial that is represented by using, as a coefficient, each bit of a binarized pattern in descending order with respect to the degree is calculated and encrypted in the same homomorphic encryption method.

Then, the homomorphic characteristic on the polynomial is used for the text polynomial and pattern polynomial, which are encrypted in the homomorphic encryption method, to perform cryptographic calculation so that each coefficient becomes a hamming distance between the text and the pattern. After that, the hamming distance is identified from each coefficient of the polynomial that is obtained by decrypting the cryptographic calculation result, and it is determined whether or not the hamming distance becomes "0". By doing so, the secure pattern matching is performed.

Specifically, a polynomial $m_t(T)=\Sigma_i t_i x^i$ is generated for a binarized text $T=(t_0, t_1, \ldots, t_{k-1})$ (also called a binary vector) having the length k by using, as a coefficient, each bit in ascending order, and an encrypted text Enc $(m_t(T), pk)$ is generated in the aforementioned homomorphic encryption method. With this calculation, the text T is masked.

On the other hand, a polynomial $m_p(P)=-\Sigma_j p_j x^{n-j}$ is generated for a binarized pattern $P=(p_0, p_1, \ldots p_{l-1})$ having the length l by using, as a coefficient, each bit in descending order, and the encrypted pattern Enc $(m_p(P), pk)$ is generated in the aforementioned homomorphic encryption method. By doing so, the pattern P is masked.

Next, the encrypted distance calculation is performed for the encrypted text Enc$(m_t(T)$, pk) and encrypted pattern Enc$(m_p(P)$, pk) as follows:

$$\text{Enc}(m_t(T),pk)*C_l+\text{Enc}(m_p(P),pk)*C_k-2\text{Enc}(m_t(T),pk)*\text{Enc}(m_p(P),pk) \quad (3)$$

Here, $C_l$ is an element including a polynomial in descending order, which has the length l, and $C_k$ is an element including a polynomial in ascending order, which has the length k, and they are represented as follows:

$$C_l=(-\Sigma_j x^{n-j},0) \quad (4)$$

$$C_k=(\Sigma_i x^i,0) \quad (5)$$

When a result obtained by decrypting a result of the encrypted distance calculation, which is obtained by the expression (3) is represented by $r_0+r_1 x+r_2 x^2+\ldots+r_{n-1}x^{n-1}$ (the polynomial of degree n, whose coefficient is equal to or less than the parameter t), the coefficient $r_i$ of the degree i in $0 \leq i \leq k-1$ is identical to the hamming distance $d(T^{(i)}, P)$ between a partial text $T^{(i)}$ whose top bit is i-th bit and the pattern P. Therefore, what part of the text T is identical to the pattern P is determined from the decryption result $r_0+r_1 x+r_2 x^2+\ldots+r_{n-1}x^{n-1}$ by identifying the degree of the coefficient that is "0". In other words, it is possible to calculate the distances between the text T and the pattern P with the text T and the pattern P encrypted in the homomorphic encryption method.

Here, a consideration method of the secure pattern matching method relating to this embodiment will be explained using FIG. 2. In a text space, in order to make it possible to set the hamming distance $d(T^{(i)}, P)$ as each coefficient of the polynomial, a following calculation is conducted.

$$\Sigma_i(\text{HW}(T^{(i)})+\text{HW}(P)-2<T^{(i)},P>)x^i \quad (6)$$

However, HW (A) represents a hamming weight of A, and <A, B> represents an inner product calculation between A and B.

Figure 2:
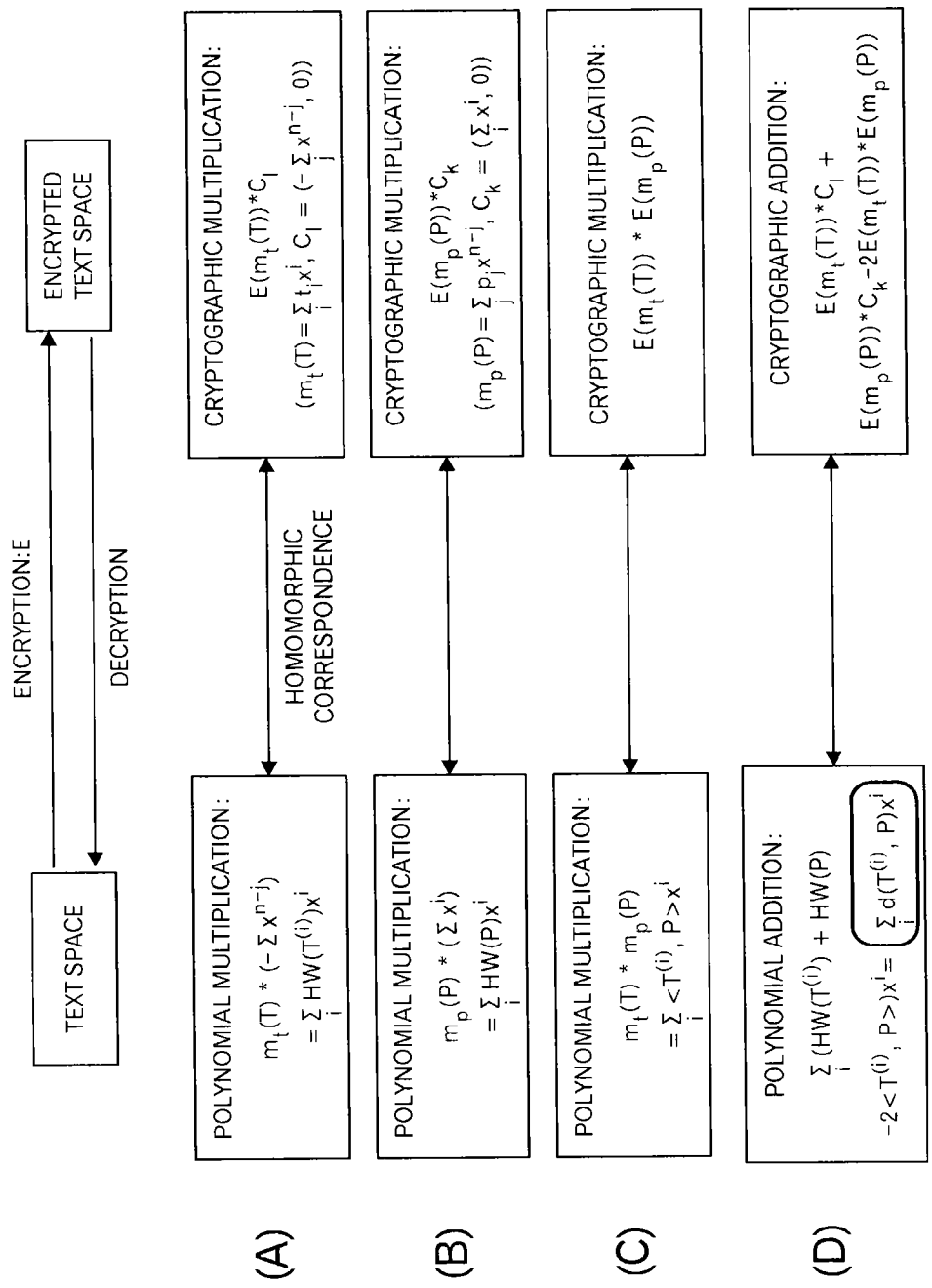
FIG. 2 is a diagram to explain encrypted distance calculation.

$\Sigma_i \text{HW}(T^{(i)})x^i$ in the expression (6) is $m_t(T)*(-\Sigma_j x^{n-j})$ as illustrated in (A) in FIG. 2. Moreover, $\Sigma_i \text{HW}(P)x^i$ in the expression (6) is $m_p(P)*(\Sigma_i x^i)$ as illustrated in (B) in FIG. 2. Furthermore, $\Sigma_i<T^{(i)}, P>x^i$ in the expression (6) is $m_t(T)*m_p(P)$ as illustrated in (C) in FIG. 2.

Then, as illustrated in FIG. 2, the corresponding cryptographic calculation in the encrypted text space is obtained for each text calculation. Therefore, as results, as illustrated in (D) in FIG. 2, by executing the cryptographic calculation as depicted in the expression (3), the calculation is conducted so that the coefficient corresponds to the hamming distance, when the decryption is performed.

However, in the calculation on the text polynomial, the polynomial of the degree that is always equal to or less than n is calculated by calculating $x^n=-1$, $x^{n+1}=-x$, ... for the polynomial of the degree that is equal to or greater than n, and a remainder obtained by dividing by the parameter t is outputted for each coefficient of the polynomial of the degree that is equal to or less than n. The space in which the aforementioned calculations are performed is often represented by Rt=Fq[x]/($x^n$+1).

Here, numerical examples of the calculations relating to this embodiment will be explained. A case is considered that whether or not a pattern P=(1, 0, 1) that has the length l=3 is included in a binarized text T=(1, 1, 0, 1, 1, 1, 0, 1) that has the length k=8 is determined while keeping the secured states of the text T and pattern P by the homomorphic encryption method. Actually, it is understood that the pattern P is identical to a second partial vector $T^{(2)}$ and sixth partial vector $T^{(6)}$ of the text T.

In order to handle a vector having the length k=8, n=8, q=1073741857 (a 30-bit prime number) and t=n=8 are used. At this time, the secret key sk and public key pk are as follows:

sk=Mod(Mod (2, 1073741857)*$x^6$+Mod (5, 1073741857)*$x^5$+Mod (5, 1073741857)*$x^4$+Mod (5, 1073741857)*$x^3$+Mod(6, 1073741857)*$x^2$+Mod (1, 1073741857)*x, $x^8$+1)

pk=(a0, a1)

a0=Mod(Mod (943067072, 1073741857)*$x^7$+Mod (208992892, 1073741857)*$x^6$+Mod(757863697, 1073741857)*$x^5$+Mod (463766550, 1073741857)*$x^4$+Mod (868678190, 1073741857)*$x^3$+Mod(79684227,

1073741857)*$x^2$+Mod (794283856, 1073741857)*x+Mod(118588567, 1073741857), $x^8$+1)

a1=Mod(Mod (476812016, 1073741857)*$x^7$+Mod (135271255, 1073741857)*$x^6$+Mod(610902088, 1073741857)*$x^5$+Mod(561030593, 1073741857)*$x^4$+Mod(693790135, 1073741857)*$x^3$+Mod(656347688, 1073741857)*$x^2$+Mod(903267448, 1073741857)*x+Mod(326511477, 1073741857), $x^8$+1)

Next, in order to encrypt the text T in the homomorphic encryption method, the text polynomial $m_t$(T)=1+x+$x^3$+$x^4$+$x^5$+$x^7$ is generated, and this text polynomial $m_t$(T) are encrypted by the public key pk as follows:

Enc ($m_t$(T) pk)=(c0, c1)

c0=Mod(Mod(571455796, 1073741857)*$x^7$+Mod (134025403, 1073741857)*$x^6$+Mod(5586025, 1073741857)*$x^5$+Mod(982959780, 1073741857)*$x^4$+Mod(172339206, 1073741857)*$x^3$+Mod(484151018, 1073741857)*$x^2$+Mod(843536573, 1073741857)*x+Mod(647203954, 1073741857), $x^8$+1)

c1=Mod(Mod(483026714, 1073741857)*$x^7$+Mod (807015171, 1073741857)*$x^6$+Mod(282283030, 1073741857)*$x^5$+Mod(326992586, 1073741857)*$x^4$+Mod(809754218, 1073741857)*$x^3$+Mod(19049111, 1073741857)*$x^2$+Mod(406264220, 1073741857)*x+Mod(18166841, 1073741857), $x^8$+1)

Next, in order to encrypt the pattern P in the homomorphic encryption method, a pattern polynomial $m_p$(P)=−$x^n$−$x^{n-1}$−$x^{n-2}$=1−$x^6$−$x^7$ (length l=3) is generated, and this pattern polynomial $m_p$(P) is encrypted by the public key pk as follows:

Enc($m_p$(p), pk)=(b0, b1)

b0=Mod(Mod(559859414, 1073741857)*$x^7$+Mod (567905533, 1073741857)*$x^6$+Mod(12416926, 1073741857)*$x^5$+Mod(844327741, 1073741857)*$x^4$+Mod(167539656, 1073741857)*$x^3$+Mod (473962809, 1073741857)*$x^2$+Mod(200462840, 1073741857)*x+Mod(281512325, 1073741857), $x^8$+1)

b1=Mod(Mod(866509748, 1073741857)*$x^7$+Mod (110516036, 1073741857)*$x^6$+Mod(103878204, 1073741857)*$x^5$+Mod(419487345, 1073741857)*$x^4$+Mod(208664258, 1073741857)*$x^3$+Mod(230233533, 1073741857)*$x^2$+Mod(428440586, 1073741857)*x+Mod(1069138858, 1073741857), $x^8$+1)

Furthermore, for the encrypted text Enc ($m_t$(T), pk) and encrypted pattern Enc ($m_p$(P), pk), $C_1$=−$x^n$−$x^{n-1}$−$x^{n-2}$=1−$x^6$−$x^7$ (length l=3) and $C_k$=1+x+$x^2$+$x^3$+$x^4$+$x^5$+$x^6$+$x^7$ (length k=8) are generated. Then, results of the encrypted distance calculation (d0, d1, d2) are calculated according to the expression (3).

d0=Mod(Mod(797968254, 1073741857)*x+Mod (466213893, 1073741857)*$x^6$+Mod (252129696, 1073741857)*$x^5$+Mod(1009528361, 1073741857)*$x^4$+Mod(535752679, 1073741857)*$x^3$+Mod(91616621, 1073741857)*$x^2$+Mod(627437050, 1073741857)*x+Mod(983411190, 1073741857), $x^8$+1)

d1=Mod(Mod(702170729, 1073741857)*$x^7$+Mod (300526001, 1073741857)*$x^6$+Mod(385829973, 1073741857)*$x^5$+Mod(6675019, 1073741857)*$x^4$+Mod (571006407, 1073741857)*$x^3$+Mod(627553259, 1073741857)*$x^2$+Mod(657519649, 1073741857)*x+Mod(465629239, 1073741857), $x^8$+1)

d2=Mod(Mod(249662899, 1073741857)*$x^7$+Mod (819300197, 1073741857)*$x^6$+Mod(802151858, 1073741857)*$x^5$+Mod(1002057738, 1073741857)*$x^4$+Mod(759197621, 1073741857)*$x^3$+Mod(488279887, 1073741857)*$x^2$+Mod(105297021, 1073741857)*x+Mod(517181369, 1073741857), $x^8$+1)

Finally, by decrypting the aforementioned result of the cryptographic calculation using the secret key sk, the decrypted result is a vector m=[2, 0, 2, 2, 2, 0, 2, 7]. However, 0-th to 5-th (=k−l=8−3) values are employed for the following determination. When this vector is represented by the polynomial, 2+2$x^2$+2$x^3$+2$x^4$ is obtained, and it is understood that the positions of the coefficient that is "0" are first-order and fifth-order terms.

Therefore, it is understood that the pattern P is identical to the second partial vector $T^{(2)}$ and the sixth partial vector $T^{(6)}$ of the text T.

FIG. 3 illustrates an outline of a system relating to one embodiment of this invention. One or plural provider apparatuses 5 that perform a processing to register the text or the like, which is the target of the matching, one or plural collator apparatuses 7 that request to perform a matching processing of the pattern for the text or the like, which is the target of the matching, and an information processing apparatus 3 included, for example, in a cloud are connected to a network 1 such as the Internet.

Figure 4:
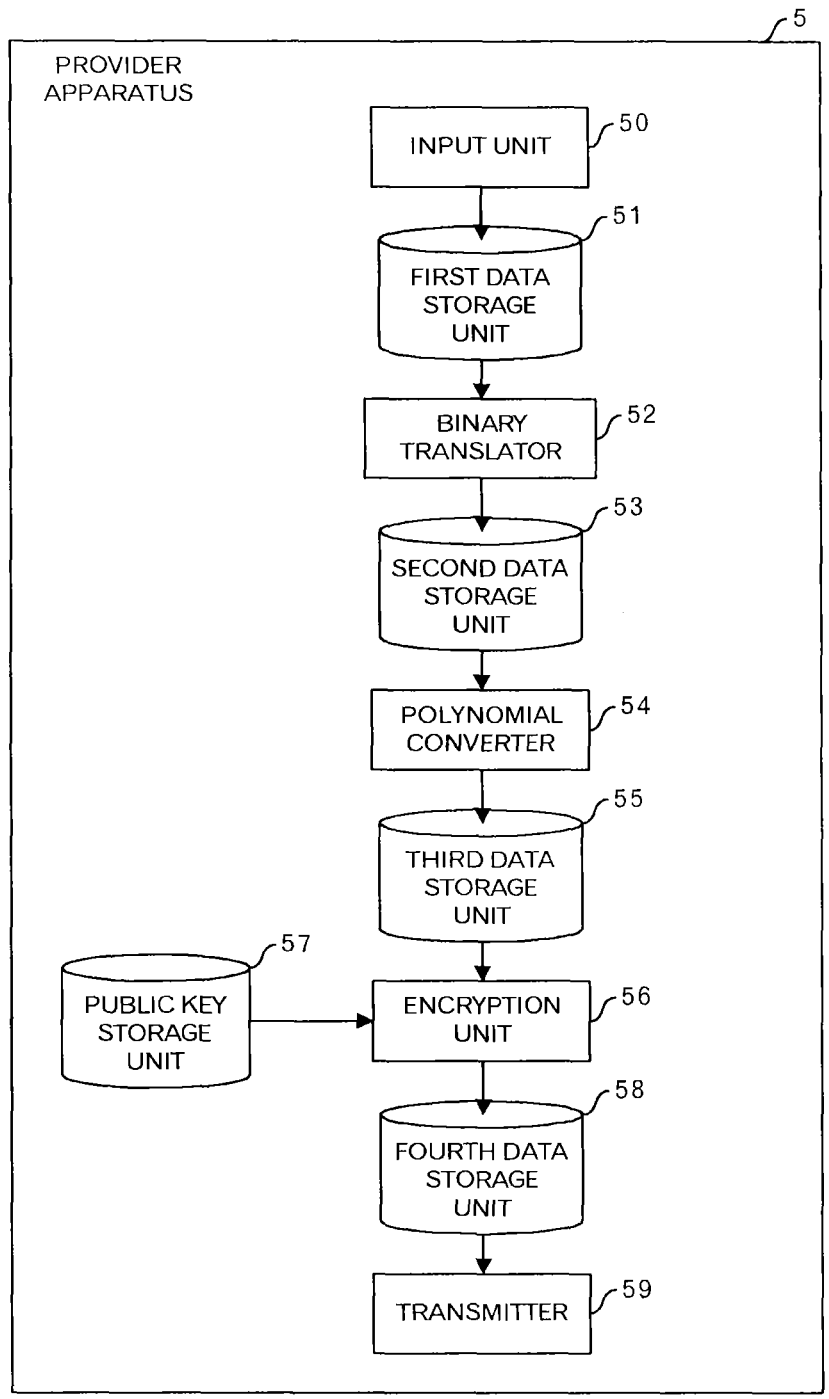
FIG. 4 is a functional block diagram of a provider apparatus.

Next, FIG. 4 illustrates a functional block diagram of the provider apparatus 5. The provider apparatus 5 has an input unit 50, a first data storage unit 51, a binary translator 52, a second data storage unit 53, a polynomial converter 54, a third data storage unit 55, an encryption unit 56, a public key storage unit 57, a fourth data storage unit 58 and a transmitter 59.

The input unit 50 obtains data of the text or the like, which is the target of the matching and to be registered in the information processing apparatus 3, from a user or another computer being connected, and stores the obtained data in the first data storage unit 51. Moreover, the binary translator 52 performs a processing to binarize data stored in the first data storage unit 51, and stores the binarized data into the second data storage unit 53. The polynomial converter 54 converts the binary vector stored in the second data storage unit 53 to the polynomial, and stores the polynomial in the third data storage unit 55. The encryption unit 56 encrypts the polynomial stored in the third data storage unit 55 using the public key of the collator, which is stored in the public key storage unit 57, according to the homomorphic encryption method that is capable of performing the polynomial calculation, and stores the encrypted data in the fourth data storage unit 58. The transmitter 59 transmits data stored in the fourth data storage unit 58 and the length k of the text to the information processing apparatus 3.

Figure 5:
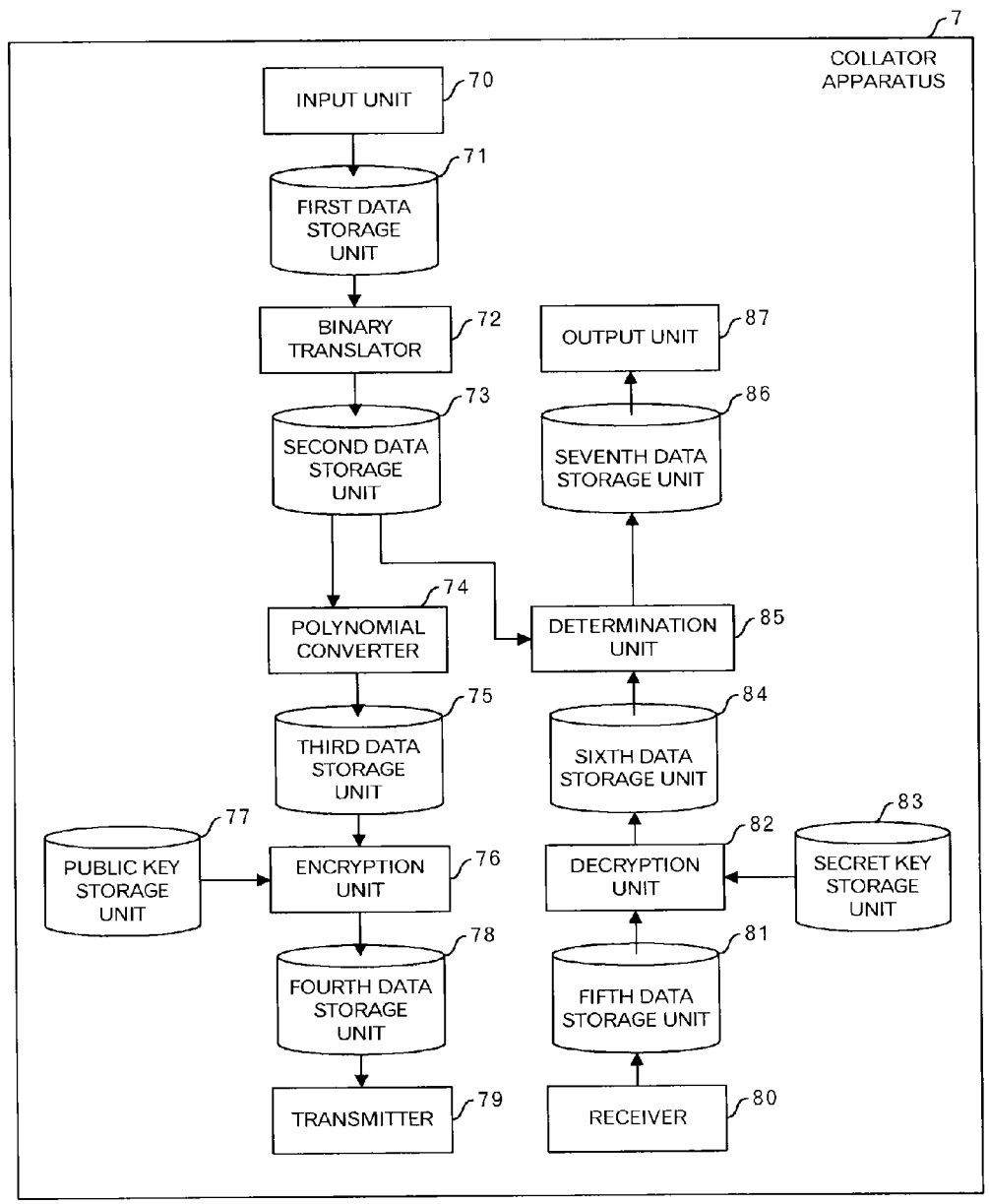
FIG. 5 is a functional block diagram of a collator apparatus.

Next, FIG. 5 illustrates a functional block diagram of the collator apparatus 7. The collator apparatus 7 has an input unit 70, a first data storage unit 71, a binary translator 72, a second data storage unit 73, a polynomial converter 74, a third data storage unit 75, an encryption unit 76, a public key storage unit 77, a fourth data storage unit 78, a transmitter 79, a receiver 80, a fifth data storage unit 81, a decryption unit 82, a secret key storage unit 83, a sixth data storage unit 84, a determination unit 85, a seventh data storage unit 86 and an output unit 87.

The input unit 70 obtains data of the pattern to be collated with the data of the text or the like, which is the matching target, from a user or another computer being connected, and stores the obtained data in the first data storage unit 71. Moreover, the binary translator 72 performs a processing to binarize data stored in the first data storage unit 71, and stores the binarized data in the second data storage unit 73. The polynomial converter 74 converts the binary vector stored in the second data storage unit 73 into a polynomial, and stores data of the polynomial to the third data storage unit 75. The encryption unit 76 encrypts the polynomial stored in the third data storage unit 75 by using the public key of the collator, which is stored in the public key storage unit 77, according to the homomorphic encryption method that is capable of performing the polynomial calculation, and stores encrypted data in the fourth data storage unit 78. The transmitter 79 transmits data stored in the fourth data storage unit 78 and the length l of the pattern to the information processing apparatus 3.

Moreover, the receiver 80 receives a result of cryptographic calculation from the information processing apparatus 3, and stores the received data in the fifth data storage unit 81. The decryption unit 82 performs a decryption processing using the secret key of the collator, which is stored in the secret key storage unit 83, and stores the processing result in the sixth data storage unit 84. The determination unit 85 determines, from data of the polynomial, which is stored in the sixth data storage unit 84, whether or not a portion, which is identical to the pattern, exists in the text or the like, and stores a determination result in the seventh data storage unit 86. The output unit 87 outputs the determination result stored in the seventh data storage unit 86 to an output device (e.g. another computer, printer, display device or the like).

Figure 6:
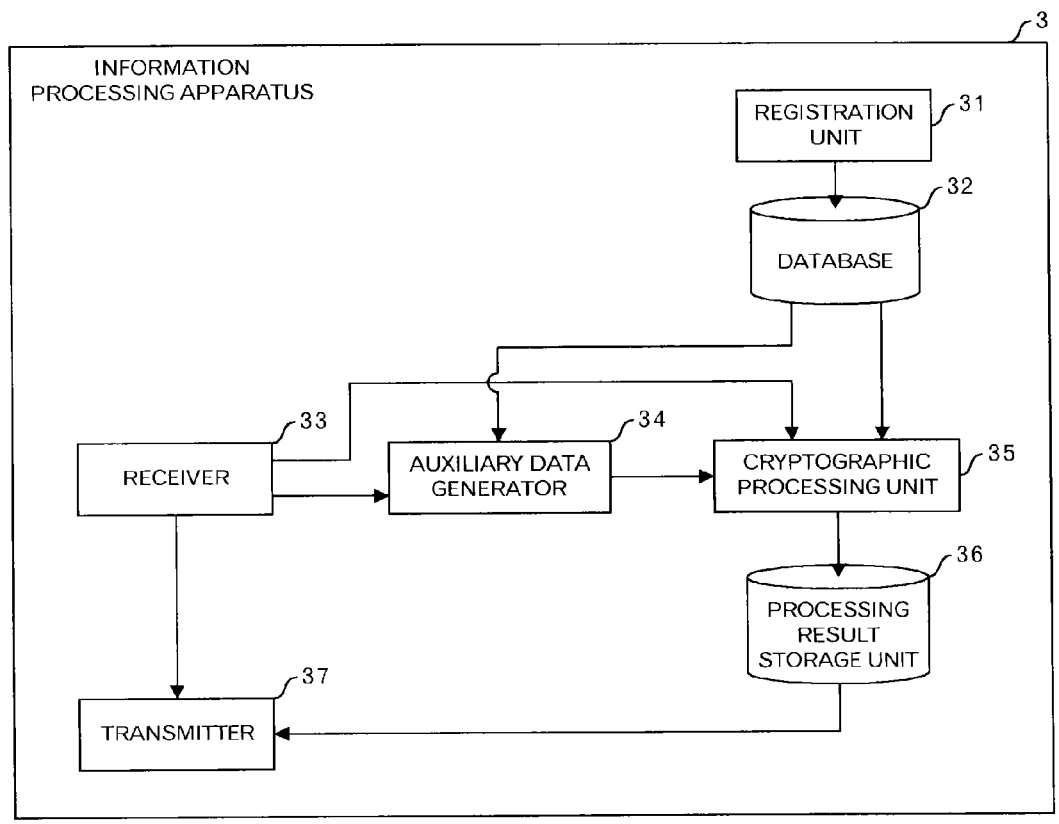
FIG. 6 is a functional block diagram of an information processing apparatus.

Next, FIG. 6 illustrates a functional block diagram of the information processing apparatus 3. The information processing apparatus 3 has a registration unit 31, a database 32, a receiver 33, an auxiliary data generator 34, a cryptographic processing unit 35, a processing result storage unit 36 and a transmitter 37.

The registration unit 31 receives the encrypted data of the text that is the matching target and the length k from the provider apparatus 5, and stores the received data into the database 32. The receiver 33 receives the encrypted data of the pattern to be collated and the length l from the collator apparatus outputs the encrypted data of the pattern to be collated to the cryptographic processing unit 35, and outputs the length l to the auxiliary data generator 34.

The auxiliary data generator 34 generates auxiliary data from the length k for the encrypted data of the text, which is the target of the matching and stored in the database 32, and the length l received from the receiver 33, and outputs the auxiliary data to the cryptographic processing unit 35.

The cryptographic processing unit 35 uses the encrypted data of the pattern to be collated, the auxiliary data and the encrypted data of the text, which is the target of the matching and stored in the database 32, to execute cryptographic calculation represented by the aforementioned expression (3), and stores a calculation result and k−l in the processing result storage unit 36. Then, the transmitter 37 transmits the calculation result and k−l, which are stored in the processing result storage unit 36, to a collation requesting source obtained from the receiver 33.

Next, processing contents of the system illustrated in FIG. 3 will be explained by using FIGS. 7 and 8.

Firstly, a processing when the provider apparatus 5 registers the encrypted data of the text, which is the target of the matching, into the information processing apparatus 3 will be explained by using FIG. 7.

Figure 7:
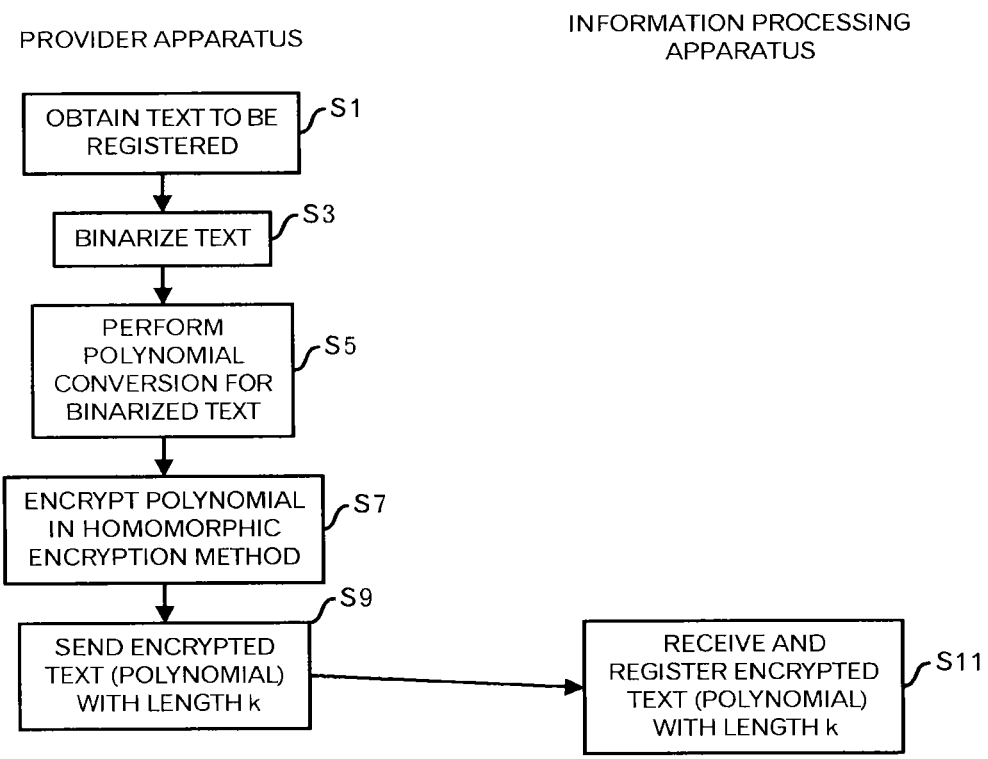
FIG. 7 is a diagram depicting a processing flow of a registration processing.

The input unit 50 of the provider apparatus 5 obtains a text to be registered in the information processing apparatus 3 (the text is a mere example, and image data, gene symbol string or the like may be employed) from an information provider, another computer or the like, and stores the obtained text in the first data storage unit 51 (FIG. 7: step S1). Then, the binary translator 52 binarizes the text stored in the first data storage unit 51, and stores the binarized text data $T=(t_0, t_1, \ldots, t_{k-1})$ in the second data storage unit 53 (step S3).

Moreover, the polynomial converter 54 performs polynomial conversion for the binarized text T, and stores a polynomial $m_t(T)$ generated by the polynomial conversion in the third data storage unit 55 (step S5). Specifically, the polynomial $m_t(T)=\Sigma_i t_i x^i$ is generated by using, as a coefficient of each degree, each component $t_i$ of the binarized text T in ascending order. The polynomial converter 54 also stores the bit length k of the binarized text T in the third data storage unit 55.

Then, the encryption unit 56 generates an encrypted text $Enc(m_t(T))$ by encrypting the polynomial $m_t(T)$ stored in the third data storage unit 55 by using the public key pk of the collator, which is stored in the public key storage unit 57, according to the homomorphic encryption method that is capable of performing the polynomial calculation, and stores the encrypted text $Enc(m_t(T))$ in the fourth data storage unit 58 (step S7). The encryption unit 56 also stores the bit length k of the text T in the fourth data storage unit 58. $Enc(Z)$ represents a processing to encrypt Z according to the homomorphic encryption method that is capable of performing the polynomial calculation.

After that, the transmitter 59 transmits the encrypted text $Enc(m_t(T))$ stored in the fourth data storage unit 58 and length k to the information processing apparatus 3 (step S9).

The registration unit 31 of the information processing apparatus 3 receives the encrypted text $Enc(m_t(T))$ and length k, and registers them in the database 32 (step S11).

By performing the aforementioned processing, the text or the like in the encrypted state can be registered in the information processing apparatus 3 provided in the cloud or the like.

Next, processing contents when the collator causes to perform a collation processing for a specific pattern will be explained by using FIG. 8.

Figure 8:
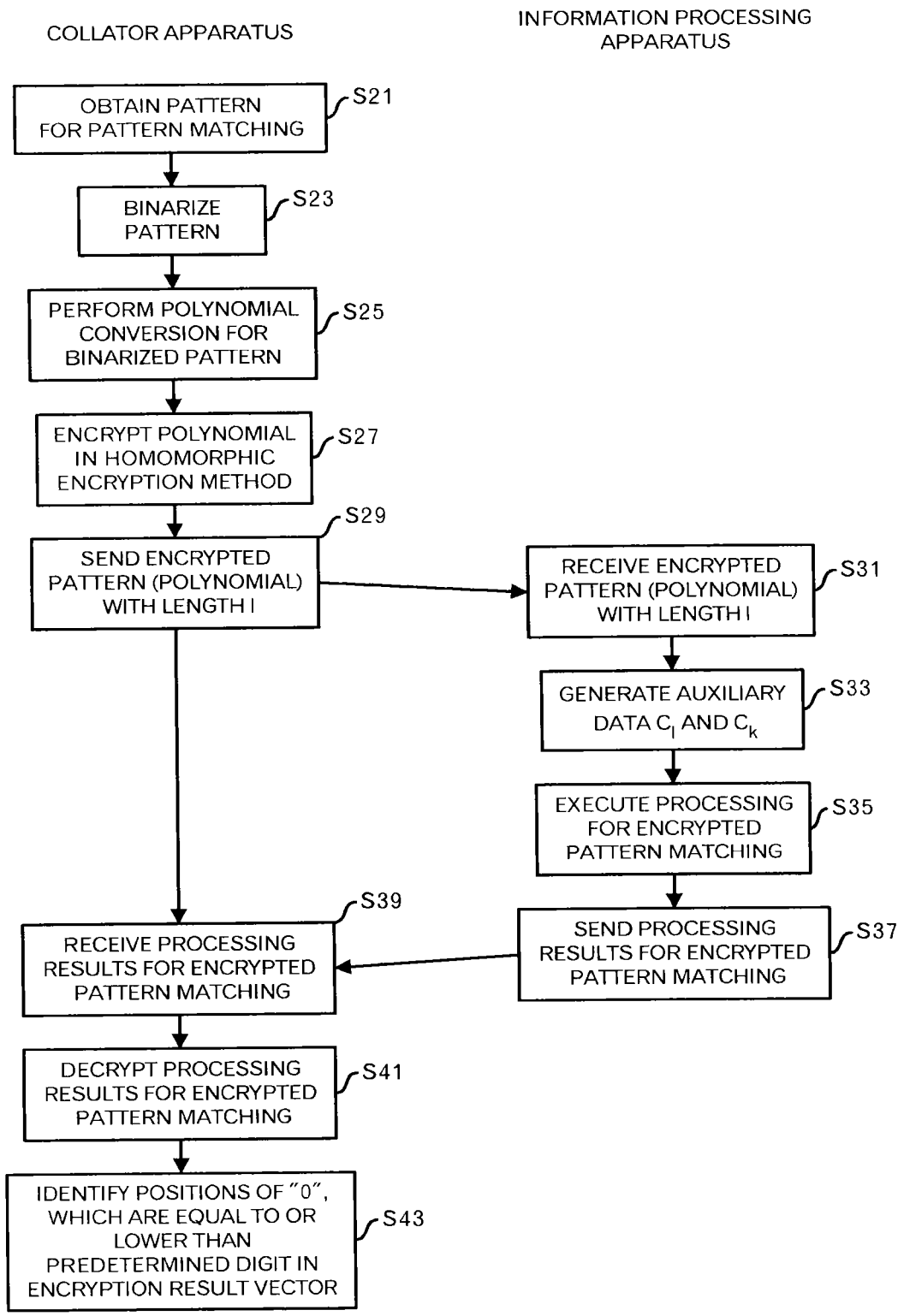
FIG. 8 is a diagram depicting a processing flow of a collation processing.

The input unit 70 of the collator apparatus 7 obtains data of the pattern to be collated with the data of the text, which is the target of the matching, from the information provider or another computer, for example, and stores the obtained data in the first data storage unit 71 (FIG. 8: step S21). Then, the binary translator 72 binarizes the pattern stored in the first data storage unit 71, and stores data of the binarized pattern $P=(p_0, p_1, \ldots, p_{l-1})$ in the second data storage unit 73 (step S23).

Moreover, the polynomial converter 74 performs polynomial conversion for the binarized pattern P, and stores the polynomial $m_p(P)$ generated by the polynomial conversion in the third data storage unit 75 (step S25). Specifically, by using, as a coefficient of each degree, each component $p_j$ of the binarized pattern P in descending order, the polynomial $m_p(P)=\Sigma_j p_j x^{n-j}$ is generated. The polynomial converter 74 also stores the bit length l of the binarized pattern P in the third data storage unit 75.

Then, the encryption unit 76 generates the encrypted pattern $Enc(m_p(P))$ by encrypting the polynomial $m_p(P)$ stored in the third data storage unit 75 by using the public key pk of the collator, which is stored in the public key storage unit 77, according to the homomorphic encryption method that is capable of performing the polynomial calculation, and stores the encrypted pattern $Enc(m_p(p))$ in the fourth data storage unit 78 (step S27). The encryption unit 76 also stores the bit length l of the pattern P in the fourth data storage unit 78.

After that, the transmitter 79 transmits the encrypted pattern Enc ($m_p(P)$) and length l, which are stored in the fourth data storage unit 78, to the information processing apparatus 3 (step S29).

The receiver 33 of the information processing apparatus 3 receives the encrypted pattern Enc ($m_p(P)$) and length l (step S31), outputs the encrypted pattern Enc ($m_p(P)$) to the cryptographic processing unit 35, and outputs the length l to the auxiliary data generator 34.

When the auxiliary data generator 34 receives the length l of the pattern P from the receiver 33, the auxiliary data generator 34 reads out the length k of the text T from the database 32, generates the auxiliary data $C_l$ and $C_k$, and outputs the generated auxiliary data to the cryptographic processing unit 35 (step S33). The auxiliary data $C_l$ and $C_k$ is generated according to the expressions (4) and (5).

After that, the cryptographic processing unit 35 performs calculation of the secure pattern matching according to the expression (3) by using the encrypted text Enc ($m_t(T)$) stored in the database 32, encrypted pattern Enc ($m_p(P)$) and auxiliary data $C_l$ and $C_k$, and stores a calculation result d=(d0, d1, . . . ) into the processing result storage unit 36 (step S35). The cryptographic processing unit 35 also calculates k-l, and stores k-l in the processing result storage unit 36.

Then, the transmitter 37 transmits the calculation result d and length k-l, which are stored in the processing result storage unit 36, to the collator apparatus 7 that transmitted the encrypted pattern and the like to the receiver 33 (step S37).

The receiver 80 of the collator apparatus 7 receives the calculation result d and length k-l from the information processing apparatus 3, and stores them in the fifth data storage unit 81 (step S39). Then, the decryption unit 82 generates a decryption result vector m=[$m_0, m_1, \ldots, m_{n-1}$] by decrypting the calculation result d by using the secret key sk stored in the secret key storage unit 83 according to the homomorphic encryption method that is capable of performing the polynomial calculation, and stores the decryption result vector m in the sixth data storage unit 84 (step S41). The length k-l is also stored in the sixth data storage unit 84.

The determination unit 85 determines whether or not a portion that is identical to the pattern exists in the text that is the target of the matching, by identifying the positions whose value is "0" among component values from 0 to k-l in the decryption result vector m stored in the sixth data storage unit 84 (step S43). In case of the decryption result vector m=[2, 0, 2, 2, 2, 0, 2, 7] and k-l=8-3=5, the positions "1" and "5" whose value is "0" exists in [2, 0, 2, 2, 2, 0], which is extracted from the left in sequence from the decryption result vector m. Therefore, it is understood that there are portions which is identical to the pattern in the text that is the target of the matching. Furthermore, it is understood that portions which are identical to the pattern exists at the second bit and sixth bit in the binarized text T. The determination unit 85 stores a determination result in the seventh data storage unit 86. The output unit 87 outputs the determination result to an output device or the like (display device, printer, other computer) in response to a request from the collator or the like.

By performing the aforementioned processing, it is possible to obtain the calculation result of the secure pattern matching to determine whether or not the pattern is identical to at least a part of the text that is the target of the matching, with the pattern and text encrypted. Then, when the calculation result is decrypted in the collator apparatus 7 by the secret key that is kept only by the collator, it is possible to determine whether or not the pattern is identical to a portion of the text that is the target of the matching and to identify the position of the portion, which is identical to the pattern.

For example, when a method is employed in which each of k elements in the binarized text T is encrypted, data of k encrypted texts is generated. On the other hand, according to the aforementioned embodiment, only one encrypted text is generated because the polynomial conversion is performed. Similarly, when the former method is employed, data of l encrypted texts is generated, because each of l elements in the binarized pattern P is encrypted. On the other hand, according to the aforementioned embodiment, only one encrypted pattern is generated because the polynomial conversion is performed. Thus, the size of the encrypted data is reduced.

On the other hand, when the former method is employed, in the calculation of the secure pattern matching, the hamming distance for each component position from 0 to k-l is calculated. Then, the hamming distance calculation in the encrypted text space $\Sigma_i^1$ (E ($t_i$)+E ($p_i$)-2E ($t_i$)*E($p_i$)) (E ($t_i$) represents the encrypted result of the i-th element in the text T, and E($p_i$) represents the encrypted result of the i-th element in the pattern P.) is repeated (k-l+1) times. In other words, when it is assumed that the cryptographic multiplication is the main calculation cost, the cryptographic multiplication is performed l*(k-l+1) times in the former method. On the other hand, in this embodiment, the cryptographic multiplication is performed 3 times according to the expression (3).

Accordingly, the calculation loads in this embodiment is reduced compared with the former method.

As described above, according to this embodiment, it is possible to reduce the calculation cost for the secure pattern matching.

However, the aforementioned calculation in the embodiment is a basic method, and various modification can be made.

For example, as illustrated in FIG. 9, the signs of the polynomial of the binarized text $m_t(T)$, polynomial of the binarized pattern $m_p(P)$, auxiliary data $C_l$ and $C_k$ may be changed, variously. However, when the distance calculation expression is specifically written down, the same content is obtained.

As understood from FIG. 9, when the polynomial of the binarized text $m_t(T)$ is generated, each component of the binarized text T is used as a coefficient in ascending order, however, the auxiliary data $C_1$, which is used for this polynomial $m_t(T)$, includes terms from degree n to (n-l+1) in descending order, and each of coefficients of the terms is "1". Moreover, as for the polynomial of the binarized pattern $m_p(P)$, each component of the binarized pattern P is used in descending order for each term from degree n to (n-l+1), however, the auxiliary data $C_k$, which is used for the polynomial $m_p(P)$, includes the terms whose coefficient is "1" in ascending order. In other words, the combination of the ascending order and descending order is employed for the multiplication.

Furthermore, variations as illustrated in FIG. 10 may be employed. FIG. 10 illustrates cases where the ascending order and descending order are inverted and the inversion of the sign is considered.

Although the embodiment of this invention was explained above, this invention is not limited to the embodiment. For example, the functional block diagrams of the respective apparatuses are mere examples, and do not correspond to a program module configuration. Moreover, as for the processing flows, as long as the processing results do not change, the turns of the steps may be exchanged and plural steps may be executed in parallel.

Moreover, instead of one computer, each apparatus may be implemented by plural computers. Moreover, the collator apparatus 7 and provider apparatus 5 may be integrated.

In addition, the aforementioned information processing apparatus 3, provider apparatus 5 and collator apparatus 7 are computer devices as illustrated in FIG. 11. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 11. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are outlined as follows:

An information processing method relating to a first aspect of the embodiment includes (A) generating a first binary vector from first data stored in a first data storage unit; (B) generating a first polynomial that is represented by using, as coefficients, components of the first binary vector in first order that is either ascending order or descending order with respect to degree of the first polynomial; and (C) encrypting the first polynomial in a homomorphic encryption method that can handle a polynomial processing.

By generating the polynomial as described above and encrypting the polynomial according to the homomorphic encryption method that is capable of performing the polynomial calculation, the data amount of the encrypted data and calculation loads can be reduced and the cost for the secure pattern matching can be reduced. The first data may be a text that is the target of the matching or may be a pattern to be collated. Then, a different order among the ascending order and the descending order is employed between the text and the pattern.

Moreover, the aforementioned information processing method may include: (D) performing a predetermined processing in an encrypted text space by using the encrypted first polynomial and an encrypted second polynomial that is obtained by encrypting a second polynomial in the homomorphic encryption method and is stored in the second data storage unit. The second polynomial may be represented by using, as coefficients, components of a second binary vector generated from second data in second order that is different from the first order with respect to degree of the second polynomial, and the predetermined processing may be defined so that a coefficient of each term in a third polynomial that is obtained by decrypting a result of the predetermined processing represents a distance at each component position of the second binary vector, from which the first binary vector is compared.

Thus, by performing the calculation for the encrypted data without decrypting the first polynomial and the second polynomial, the pattern matching is conducted. As for the predetermined processing, the calculation loads can be reduced, because the aforementioned polynomial conversion is performed.

Moreover, the aforementioned information processing method may further include (E) determining whether zero exists among values of coefficients in the third polynomial. The predetermined processing is a processing to perform such a processing, and not only the presence of the coefficient whose value is "0", but also the position in the text, which is identical to the pattern can be identified.

Furthermore, the aforementioned predetermined processing may be defined by a distance calculation expression including a first term of a product of the encrypted first polynomial and first auxiliary data, a second term of a product of the encrypted second polynomial and second auxiliary data and a third term of a product of the encrypted first polynomial and the encrypted second polynomial. Thus, the number of times that the cryptographic multiplication is performed is reduced.

Furthermore, the aforementioned first auxiliary data may include: (a) a fourth polynomial that has n terms in descending order, which are included within a fifth polynomial of a predetermined order, which has terms whose coefficients are all "1", in case where the first order is ascending order and the n is the number of components of the first binary vector, and the first auxiliary data may include (b) a sixth polynomial whose order corresponds to the number of components of the first binary vector and that has terms whose coefficients are all "1", in case where the first order is descending order. Moreover, the aforementioned second auxiliary data may include: (c) a seventh polynomial whose order corresponds to the number of components of the second binary vector and that has terms whose coefficients are all "1", in case where the second order is descending order, and the second auxiliary data may include (d) an eighth polynomial that has m terms in descending order, which are included within the fifth polynomial, in case where the second order is ascending order and the m is the number of components of the second binary vector. Various modification can be made without changing the essence of the predetermined processing.

Furthermore, the aforementioned information processing method may further include: (F) transmitting the encrypted first polynomial to another computer, wherein the another computer is accessible to a storage device that stores an encrypted second polynomial, which is encrypted in the homomorphic encryption method, and a second polynomial is represented by using, as coefficients, components of a second binary vector generated from second data in second order that is different from the first order with respect to degree of the second polynomial; and (G) receiving, from the another computer, a processing result that is obtained by performing a predetermined processing in an encrypted text space by using the encrypted first polynomial and the encrypted second polynomial; and (H) identifying a position of a coefficient whose value is zero among coefficients of terms in a third polynomial obtained by decrypting the processing result. In case of the collator apparatus in the embodiment, such a processing is performed.

An information processing method relating to a second aspect of the embodiment includes: (A) receiving an encrypted first polynomial that is obtained by encrypting, in a homomorphic encryption method that handles a polynomial processing, a first polynomial, from another computer, wherein the first polynomial is represented by using, as coefficients, components of a first binary vector generated from first data in first order that is either ascending order or descending order with respect to degree of the first polynomial; (B) performing, by using the computer, a predetermined processing in an encrypted text space by using the encrypted first polynomial and an encrypted second polynomial that is obtained by encrypting a second polynomial in the homomorphic encryption method, wherein the second polynomial is represented by using, as coefficients, components of a second binary vector generated from second data in second order that is different from the first order with respect to degree of the second polynomial; and (C) transmitting a result of the predetermined processing to the another computer. Then, the predetermined processing is defined so that a coefficient of each term in a third polynomial that is obtained by decrypting the result of the predetermined processing represents a distance at each component position of the second binary vector, from which the first binary vector is compared.

The calculation cost required for the predetermined processing is reduced, because polynomial conversion results are used.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing method, comprising:
generating, by using any computer of a plurality of computers, a first binary vector from first data;
generating, by using any computer of the plurality of computers, a first polynomial that is represented by using, as coefficients, components of the first binary vector in first order that is either ascending order or descending order with respect to degree of the first polynomial;
encrypting, by using any computer of the plurality of computers, the first polynomial in a homomorphic encryption method that handles a polynomial processing;
performing, by using any computer of the plurality of computers, a predetermined processing in an encrypted text space by using the encrypted first polynomial and an encrypted second polynomial that is obtained by encrypting a second polynomial in the homomorphic encryption method; and
determining, by using any computer of the plurality of computers, whether zero exists among values of coefficients in a third polynomial that is obtained by decrypting a result of the predetermined processing, wherein
the second polynomial is represented by using, as coefficients, components of a second binary vector generated from second data in second order that is different from the first order with respect to degree of the second polynomial, and
the predetermined processing is defined so that a coefficient of each term in the third polynomial represents a distance at each component position of the second binary vector, from which the first binary vector is compared.

2. The information processing method as set forth in claim 1, wherein
the predetermined processing is defined by a distance calculation expression including a first term of a product of the encrypted first polynomial and first auxiliary data, a second term of a product of the encrypted second polynomial and second auxiliary data and a third term of a product of the encrypted first polynomial and the encrypted second polynomial.

3. The information processing method as set forth in claim 2, wherein
the first auxiliary data includes a fourth polynomial that has n terms in descending order, which are included within a fifth polynomial of a predetermined order, which has terms whose coefficients are all "1", in case where the first order is ascending order and the n is the number of components of the first binary vector,
the first auxiliary data includes a sixth polynomial whose order corresponds to the number of components of the first binary vector and that has terms whose coefficients are all "1", in case where the first order is descending order,
the second auxiliary data includes a seventh polynomial whose order corresponds to the number of components of the second binary vector and that has terms whose coefficients are all "1", in case where the second order is descending order, and
the second auxiliary data includes an eighth polynomial that has m terms in descending order, which are included within the fifth polynomial, in case where the second order is ascending order and the m is the number of components of the second binary vector.

4. The information processing method as set forth in claim 1, further comprising:
transmitting the encrypted first polynomial to another computer, wherein the another computer is accessible to a storage device that stores the encrypted second polynomial; and
receiving, from the another computer, the result of the predetermined processing.

5. An information processing method, comprising:
receiving, by using a computer, an encrypted first polynomial that is obtained by encrypting, in a homomorphic encryption method that handles a polynomial processing, a first polynomial, from another computer, wherein the first polynomial is represented by using, as coefficients, components of a first binary vector generated from first data in first order that is either ascending order or descending order with respect to degree of the first polynomial;

generating, by using the computer, first auxiliary data that includes a second polynomial and second auxiliary data that includes a third polynomial, wherein the second polynomial has terms in ascending order with respect to degree of the second polynomial, the third polynomial has terms in descending order with respect to degree of the third polynomial, and coefficients of the terms in the second polynomial and coefficients of the terms in the third polynomial are "1", performing, by using the computer, a predetermined processing in an encrypted text space by using the first auxiliary data, the second auxiliary data, the encrypted first polynomial and an encrypted fourth polynomial that is obtained by encrypting a fourth polynomial in the homomorphic encryption method, wherein the fourth polynomial is represented by using, as coefficients, components of a second binary vector generated from second data in second order that is different from the first order with respect to degree of the fourth polynomial; and transmitting, by using the computer, a result of the predetermined processing to the another computer, wherein the predetermined processing is defined so that a coefficient of each term in a fifth polynomial that is obtained by decrypting the result of the predetermined processing represents a distance at each component position of the second binary vector, from which the first binary vector is compared.

6. A non-transitory computer-readable storage medium storing a program for causing a computer to execute a process, the process comprising:

receiving an encrypted first polynomial that is obtained by encrypting, in a homomorphic encryption method that handles a polynomial processing, a first polynomial, from another computer, wherein the first polynomial is represented by using, as coefficients, components of a first binary vector generated from first data in first order that is either ascending order or descending order with respect to degree of the first polynomial;

generating first auxiliary data that includes a second polynomial and second auxiliary data that includes a third polynomial, wherein the second polynomial has terms in ascending order with respect to degree of the second polynomial, the third polynomial has terms in descending order with respect to degree of the third polynomial, and coefficients of the terms in the second polynomial and coefficients of the terms in the third polynomial are "1";

performing a predetermined processing in an encrypted text space by using the first auxiliary data, the second auxiliary data, the encrypted first polynomial and an encrypted fourth polynomial that is obtained by encrypting a fourth polynomial in the homomorphic encryption method, wherein the fourth polynomial is represented by using, as coefficients, components of a second binary vector generated from second data in second order that is different from the first order with respect to a degree of the fourth polynomial; and transmitting a result of the predetermined processing to the another computer, wherein the predetermined processing is defined so that a coefficient of each term in a fifth polynomial that is obtained by decrypting the result of the predetermined processing represents a distance at each component position of the second binary vector, from which the first binary vector is compared.

7. An information processing system, comprising:
a first information processing apparatus; and
a second information processing apparatus, wherein
the first information processing apparatus comprises:
a first memory; and
a first processor configured to use the first memory and execute a first process, the first process comprising:
generating a first binary vector from first data;
generating a first polynomial that is represented by using, as coefficients, components of the first binary vector in first order that is either ascending order or descending order with respect to degree of the first polynomial;
encrypting the first polynomial in a homomorphic encryption method that handles a polynomial processing; and
transmitting the encrypted first polynomial to the second information processing apparatus, and
the second information processing apparatus comprises:
a second memory;
a second processor configured to use the second memory and execute a second process, the second process comprising:
receiving, from the first information processing apparatus, the encrypted first polynomial;
performing a predetermined processing in an encrypted text space by using the encrypted first polynomial and an encrypted second polynomial that is obtained by encrypting a second polynomial in the homomorphic encryption method; and
transmitting a result of the predetermined processing to the first information processing apparatus,
the first process further comprises:
receiving, from the second information processing apparatus, the result of the predetermined processing; and
determining whether zero exists among values of coefficients in a third polynomial that is obtained by decrypting the result of the predetermined processing, wherein
the second polynomial is represented by using, as coefficients, components of a second binary vector generated from second data in second order that is different from the first order with respect to degree of the second polynomial, and
the predetermined processing is defined so that a coefficient of each term in the third polynomial represents a distance at each component position of the second binary vector, from which the first binary vector is compared.

8. An information processing apparatus, comprising:
a memory; and
a processor configured to use the memory and execute a process, the process comprising:
receiving an encrypted first polynomial that is obtained by encrypting, in a homomorphic encryption method that handles a polynomial processing, a first polynomial, from another computer, wherein the first polynomial is represented by using, as coefficients, components of a first binary vector generated from first data in first order that is either ascending order or descending order with respect to degree of the first polynomial;

generating first auxiliary data that includes a second polynomial and second auxiliary data that includes a third polynomial, wherein the second polynomial has terms in ascending order with respect to degree of the second polynomial, the third polynomial has terms in descending order with respect to degree of the third polynomial, and coefficients of the terms in the second polynomial and coefficients of the terms in the third polynomial are "1";

performing a predetermined processing in an encrypted text space by using the first auxiliary data, the second auxiliary data, the encrypted first polynomial and an encrypted fourth polynomial that is obtained by encrypting a fourth polynomial in the homomorphic encryption method, wherein the fourth polynomial is represented by using, as coefficients, components of a second binary vector generated from second data in second order that is different from the first order with respect to degree of the fourth polynomial; and transmitting a result of the predetermined processing to the another computer, wherein the predetermined processing is defined so that a coefficient of each term in a fifth polynomial that is obtained by decrypting the result of the predetermined processing represents a distance at each component position of the second binary vector, from which the first binary vector is compared.

* * * * *